March 8, 1955 H. GRAYSON ET AL 2,703,865
FREQUENCY MODULATION CARRIER CURRENT SYSTEM
Filed May 10, 1951
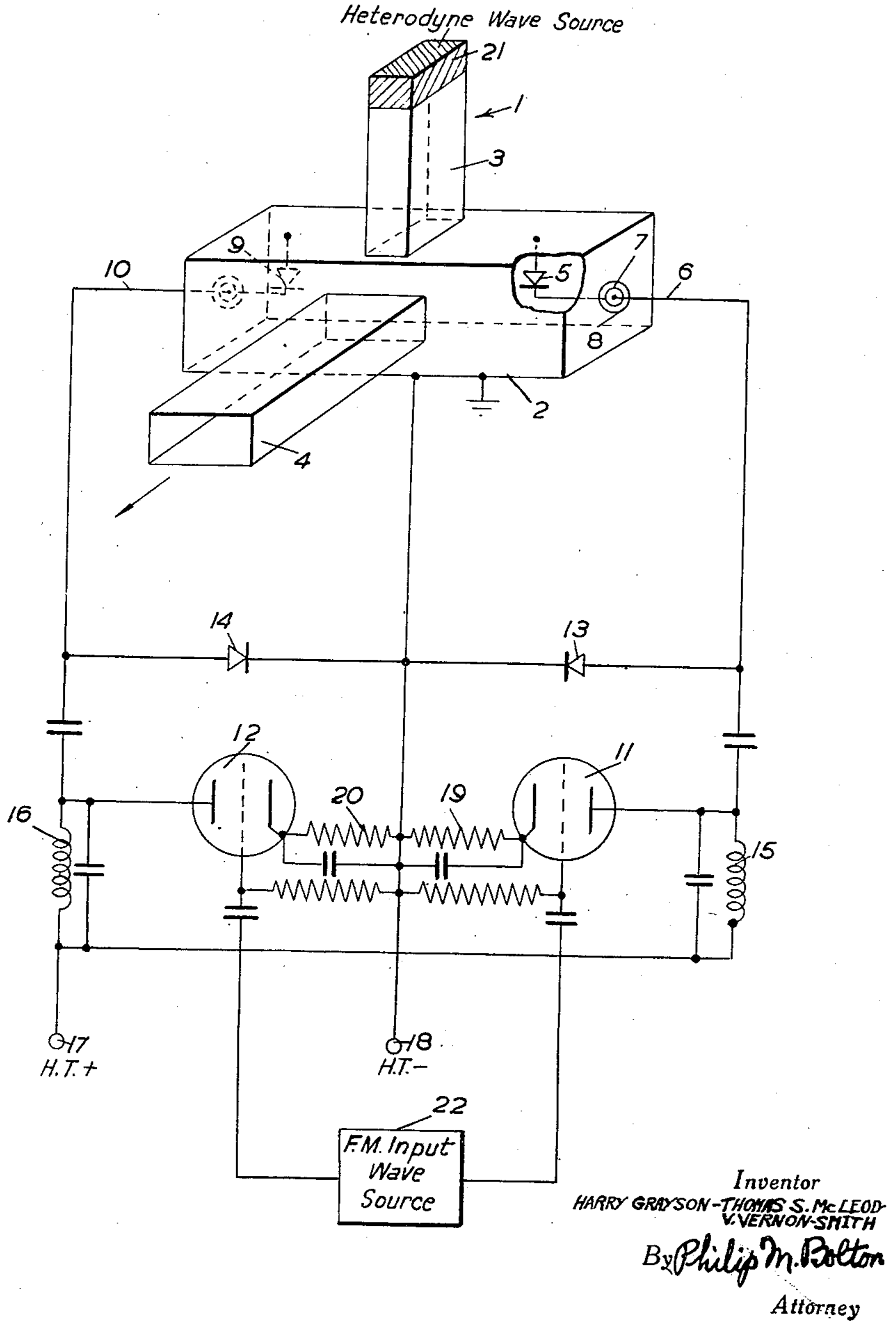
Inventor
HARRY GRAYSON - THOMAS S. McLEOD - V. VERNON-SMITH
By Philip M. Bolton
Attorney 2,703,865

FREQUENCY MODULATION CARRIER CURRENT SYSTEM

Harry Grayson, Thomas Symington McLeod, and Vernon Vernon-Smith, London, England, assignor to International Standard Electric Corporation, New York, N. Y.

Application May 10, 1951, Serial No. 225,612

Claims priority, application Great Britain May 15, 1950

6 Claims. (Cl. 332—18)

The present invention relates to electric amplitude limiting circuits used in electric carrier wave communication systems employing frequency modulation of the carrier wave.

It is known that if a low frequency wave of variable amplitude is applied to a frequency changing modulator employing a rectifier and supplied with a high frequency heterodyne wave of constant amplitude less than the minimum amplitude of the low frequency wave, the output waves of changed frequency will be of substantially constant amplitude. This provides a convenient means for stabilising the amplitude of a frequency modulated wave to a constant value. However, if the rectifier in the modulator is subjected to high reverse voltages which may be sufficient to break it down, the amplitude limiting effect is largely nullified, and in fact the output wave may be found to have an increased amplitude modulation.

It is the principal object of the invention to provide means for preventing the breakdown of the rectifier in the modulator.

This object is achieved according to the invention by providing an electric frequency changing modulator or mixer circuit employing a principal rectifier, comprising means for simultaneously applying to the rectifier input waves of a relatively low frequency and variable amplitude, and heterodyne waves of a relatively high frequency and constant amplitude which is less than the minimum amplitude of the low frequency waves, means for deriving from the rectifier output sideband waves of constant amplitude, an auxiliary rectifier connected effectively in parallel with the principal rectifier, and means for electrically isolating the auxiliary rectifier from the heterodyne waves, the two rectifiers being oppositely directed as regards the parallel connection.

The invention will be described with reference to the figure of the accompanying drawing which shows a schematic circuit diagram of an embodiment of the invention. This embodiment comprises a balanced modulator 1 of known type designed for use at super high frequencies. This modulator consists of a "magic tee" arrangement of wave guides including a section 2 of rectangular cross-section closed at both ends and having two other rectangular guides 3, 4 communicating with it at the centre at right angles to each other, and with the long sides of the cross sections also at right angles. The right hand corner of the guide 2 has been broken away to show a crystal rectifier 5 arranged inside the guide near the right-hand end, having the upper terminal connected directly to the guide wall. A conductor 6 connected to the lower terminal of the rectifier 5 passes through a clearance hole in the end wall of the guide, the hole being effectively closed by a metal disc 7 connected to the conductor 6, the disc being insulated from the guide wall by a thin mica disc 8. Any other suitable method may be used for bringing out the conductor 6.

A second similar rectifier 9 is arranged at the other end of the guide 2 in just the same way, the conductor 10 being brought through the guide wall in like manner. The two rectifiers 5 and 9 are both connected to conduct when the output conductors 6 and 10 are negative to the guide wall, which is preferably grounded.

A frequency modulated input wave having a relatively low frequency (such as 60 megacycles per second) and relatively high amplitude is applied in push pull to the conductors 6 and 10 from the valves 11 and 12. A heterodyne wave of a relatively high frequency (such as 4000 megacycles per second) and constant amplitude is supplied from a suitable source 21 through the guide 3. Then frequency modulated output sidebands having frequency 4000±60 megacycles per second will be delivered from the guide 4.

If the low frequency input wave is also amplitude modulated, then by choosing the amplitude of the heterodyne wave so that the voltage applied to either rectifier at the frequency 4,000 megacycles per second is less than the minimum voltage applied thereto at the low frequency of 60 megacycles per second, it is known that the output sidebands will be of constant amplitude.

However, this result is not obtained if the low frequency voltage applied to the rectifiers in the high resistance direction is sufficient to break down the rectifiers. To prevent this, according to the invention, the two auxiliary rectifiers 13 and 14 shunt respectively the output circuits of the valves 11 and 12. These rectifiers are connected so that they substantially remove the positive loops of the low frequency waves, without affecting the negative loops. In this way the rectifiers 5 and 9 of the modulator 1 are protected against any appreciable reverse voltages.

It will be noted that the auxiliary rectifiers 13 and 14 are connected effectively in parallel with the principal rectifiers 5 and 9 as regards the low frequencies, but are outside the high frequency circuits.

The high frequencies are prevented from reaching the auxiliary rectifiers because they are effectively short-circuited by the capacity between the disc 7 and the guide wall, and by the corresponding capacity at the other end of the guide, which capacities form a rudimentary low pass filter for the low frequency waves. If desired, suitable filters (not shown) which exclude the high frequencies but pass the low frequencies may be connected between the auxiliary rectifiers and the conductors 6 and 10, either instead of, or in addition to the above-mentioned capacities.

The two valves 11 and 12 are arranged as a conventional push-pull amplifier. The anodes are connected through resonant circuits 15, 16, tuned to the input low frequency (60 megacycles), to the positive terminal 17 for the high tension source (not shown), the negative terminal 18 being connected to ground. The cathodes are suitably biased by networks 19 and 20 and the frequency modulated input waves will be applied in push-pull to the two control grids from the source 22.

It will be understood that the rectifiers 5 and 9 would both be reversed, if desired, in which case the auxiliary rectifiers 13 and 14 would also need to be reversed.

The invention is also applicable to a mixer or modulator employing only one rectifier. The corresponding auxiliary rectifier would be connected in parallel with it, but in the low frequency part of the circuit, the two rectifiers being always oppositely directed as regards the parallel circuit.

While the principles of the invention have been described above in connection with specific embodiments, and particular modifications thereof, it is to be clearly understood that this description is made only by way of example and not as a limitation on the scope of the invention.

What we claim is:

1. An electric frequency changing modulator circuit employing a principal rectifier, comprising means for simultaneously applying to the rectifier input waves of a relatively low frequency and variable amplitude, and heterodyne waves of a relatively high frequency and constant amplitude which is less than the minimum amplitude of the low frequency waves, means for deriving from the rectifier output sideband waves of constant amplitude, an auxiliary rectifier connected effectively in parallel with the principal rectifier, and means for electrically isolating the auxiliary rectifier from the heterodyne waves, the two rectifiers being oppositely directed as regards the parallel connection.

2. A balanced modulator circuit according to claim 1 comprising an additional principal rectifier to which the low and high frequency waves are also applied, a second auxiliary rectifier connected effectively in parallel with the second principal rectifier, and means for electrically isolating the second auxiliary rectifier from the heterodyne waves, the two last mentioned rectifiers being oppositely directed as regards the parallel circuit.

3. A circuit according to claim 2 comprising means for applying the low frequency input waves respectively to the two principal rectifiers in push-pull.

4. A circuit according to claim 2 in which the modulator circuit comprises a magic tee formed by wave guides.

5. An electric frequency changing modulator circuit comprising a magic tee formed by wave guides, a principal rectifier within said tee, a source of waves of relatively low frequency and variable amplitude, connections from said source to said principal rectifier, an auxiliary rectifier outside said tee connected across said source with opposite polarity relative to the principal rectifier, a source of heterodyne waves of relatively high frequency and constant amplitude which is less than the minimum amplitude of the low frequency waves, means for applying said heterodyne waves to said tee simultaneously with the application of the waves of low frequency, and means for isolating the auxiliary rectifier from the high frequency waves within said tee.

6. An electric frequency changing modulator according to claim 5 wherein said isolating means comprises a capacitance, formed between at least one of said connections and said wave guide walls, offering relatively small impedance to the high frequency waves, but of greater impedance to the frequency modulated signal waves.

References Cited in the file of this patent

UNITED STATES PATENTS

| | | |
|---|---|---|
| 2,304,135 | Wise | Dec. 8, 1942 |
| 2,423,866 | Woodyard | July 15, 1947 |
| 2,468,166 | Bruck | Apr. 26, 1949 |
| 2,468,237 | Sanders, Jr., et al. | Apr. 26, 1949 |
| 2,477,428 | Sprague et al. | July 26, 1949 |
| 2,496,521 | Dicke | Feb. 7, 1950 |
| 2,545,994 | Gabler et al. | Mar. 20, 1951 |